United States Patent [19]
Wilkey

[11] Patent Number: 5,288,800
[45] Date of Patent: Feb. 22, 1994

[54] POLYMER BLENDS

[75] Inventor: John D. Wilkey, Houston, Tex.

[73] Assignee: Shell Oil Company, Houston, Tex.

[21] Appl. No.: 996,945

[22] Filed: Dec. 28, 1992

[51] Int. Cl.$^5$ .................... C08L 69/00; C08L 53/02; C08L 51/04; C08F 287/00

[52] U.S. Cl. ........................ 525/67; 525/69; 525/90; 525/91; 525/92; 525/304

[58] Field of Search ............ 525/67, 69, 90, 91, 525/92, 304

[56] References Cited

U.S. PATENT DOCUMENTS

| | | |
|---|---|---|
| 4,255,534 | 3/1981 | Liu . |
| 4,267,096 | 5/1981 | Bussink ............................ 525/67 |
| 4,874,818 | 10/1989 | Yamamoto et al. . |
| 4,906,687 | 3/1990 | Modic .............................. 525/92 |
| 5,041,493 | 8/1991 | Natarajan ....................... 525/133 |
| 5,175,212 | 12/1992 | Modic .............................. 525/67 |

OTHER PUBLICATIONS

C. A. Cruze, D. R. Paul, and J. W. Barlow, Polyester-Polycarbonate Blends. IV. Poly($\epsilon$-caprolactone), Jour. App. Polymer Sci., vol. 23, 589–600 (1979).

I. D. McKay, Polystyrene/Polycarbonate/Polystyrene-block-Polycaprolactone Blends. Emulsification and Mechanical Performance, Jour. App. Polymer Sci., vol. 42, 281–295 (1991).

H. R. Kricheldorf, M. Berl, and N. Scharnagi, Poly(lactones). 9. Polymerization Mechanism of Metal Alkoxide Initiated Polymerizations of Lactide and Various Lactones, Am. Chem. Soc., Macromolecules, 1988, 21, 286–293.

Primary Examiner—David Buttner
Attorney, Agent, or Firm—James O. Okorafor

[57] ABSTRACT

It is herein disclosed a blend comprising modified block copolymers and aromatic polycarbonates. These blends have and exhibit improved mechanical properties, particularly improved low temperature Notched Izod impact strength relative to unmodified block copolymers, such as KRATON ® G.

9 Claims, No Drawings

POLYMER BLENDS

FIELD OF THE INVENTION

This invention generally relates to polymer blends. More particularly, the invention relates to a blend comprising modified block copolymers, such as KRATON® G polymers, and aromatic polycarbonates. These blends have and exhibit improved mechanical properties, particularly improved low temperature Notched Izod impact strength relative to unmodified block copolymers.

BACKGROUND

Aromatic polycarbonates are known in the art. Although aromatic polycarbonates are known to have mechanical excellent properties, they are also known to be relatively brittle at low temperatures. It is also known in the art that aromatic polycarbonates may be impact modified by using hydrogenated block copolymers of styrene and conjugated diolefins (rubbers). One drawback of such modification is that ductile failure is not achievable in such modified blends, because the required high amount of rubber loading results in delamination and unacceptable loss of stiffness. The practical consequence of this and other drawbacks is that it limits the fields of applications of these resins.

It, therefore, remains a desirable goal of the art/industry to produce a blend comprising aromatic polycarbonates and hydrogenated block copolymers, such as KRATON® G, which overcomes these limitations. Such a blend would among other properties, exhibit ductile failure at $-40°$ C. while retaining higher flexural modulus.

SUMMARY

Objects of the Invention

In accordance with this invention, it is now provided a blend comprising of at least one aromatic polycarbonates and hydrogenated block copolymers, such as KRATON® G, which is modified with at least one polyester which is miscible with aromatic polycarbonates.

DETAILED DESCRIPTION

Generally speaking, the materials useful in practicing this invention include aromatic polycarbonates, polyesters miscible with aromatic polycarbonates, cracking agents, and hydrogenated block copolymers, such as KRATON® G polymer. Equipment-wise, conventional processing and/or blending devices, such as extruders, are also useful.

The useful aromatic polycarbonates including their methods of manufacturing are known in the art. These aromatic poly-carbonates are typically derived from dihydric phenols such as, for example, 2,2-bis(4-hydroxyphenyl)propane (also referred to as bisphenol-A; i.e., BPA), bis(4-hydroxyphenyl)methane, 2,2-bis(4-hydroxy-3-methylphenyl)propane, 4,4-bis(4-hydroxyphenyl)-heptane, 2,2-(3,5,3',5-tetrachloro-4,4'-dihydroxyphenyl)propane, 2,2-(3,5,3',5-tetrabromo-4,4'-dihydroxy-diphenyl)propane, and (3,3'-dichloro-4,4'-dihydroxydi-phenyl)methane. The preferred aromatic polycarbonate is bisphenol-A polycarbonate. Additional information about these aromatic polycarbonates can be obtained from U.S. Pat. No. 4,255,534, and the references cited therein.

The useful polyesters are those that are miscible with aromatic polycarbonates. Examples of such compounds include polycaprolactone, poly(1,4-cyclohexanedimethylene succinate), poly(ethylene succinate), poly(ethylene adipate), poly(1,4-butylene adipate), polymer from 1,4-cyclohexanedimethanol and terephthalic acid, and polymer from 1,4-cyclohexanedimethanol and tere- and isophthalic acid (80%/20%). The preferred polyester is polycaprolactone. Additional information pertaining to these compounds can be obtained from Polycarbonates by D. Freitag, U. Grigo, P. R. Muller, and W. Nouvertne in the *Encyclopedia of Polymer Science and Engineering*, 2nd Ed; John Wiley and Sons; New York, 1988, Vol. 11, p. 648.

Any compound that is capable of generating free radicals can be used in the practice of this invention. Typically, however, peroxides are preferred. Such peroxides include 2,5 dimethyl 2,5-bis(t-butylperoxy)hexane (LUPERSOL 101), 2,5-dimethyl-2,5-bis(t-butyl peroxyl)hexane-3 (LUPERSOL 130), and di-t-butyl peroxide. LUPERSOL is a tradename of AtoChem North America.

The unmodified block copolymers are produced by free radical grafting of a selectively hydrogenated block copolymer having a specific structure. The block copolymers generally have network-forming structure of vinyl aromatic blocks and hydrogenated conjugated diene blocks wherein the vinyl aromatic blocks are phase separated into physically crosslinked domains which are connected by the conjugated diene blocks. Such a network-forming structure results when a block copolymer molecule has at least two vinyl aromatic blocks separated by a conjugated diene block of sufficient size to cause phase separation wherein the conjugated diene blocks form a continuous phase and the vinyl aromatic blocks form domains dispersed in the continuous phase. The block copolymer structure may be radial, linear, or branched.

Preferred block copolymers which may be used as precursors for the polymers of the present invention are described in U.S. Patent No. Re 27,145 as styrenic block copolymers having a linear structure $$A—B—A$$

wherein each A is a vinyl aromatic block and B is a hydrogenated conjugated diene block. The preferred vinyl aromatic block is polystyrene and the preferred conjugated diene blocks are hydrogenated polybutadiene or hydrogenated polyisoprene. The proportion of the blocks A to the block B and the relative molecular weights of each of these blocks is balanced to obtain a rubber having an optimum combination of properties such that it behaves as a vulcanized rubber without requiring the actual step of vulcanization.

Very broadly speaking, the process of making the modified block copolymer involves forming an intimate mixture of its components. This entails properly admixing and blending using appropriate devices, predetermined amounts of the block copolymer with a hydroxyethyl acrylate terminated caprolactone oligomer, commonly referred to in the trade as Tone M100 and a free radical initiator. The amount of block copolymer used is generally in the range of from about 96 to 99 wt %, while the amount of grafted Tone M100 is generally in the range of from about 1-4 wt %, with about 2 wt % being preferred. The amount of the free radical initiator used is that which is sufficient to induce the reaction.

Quantitatively speaking, this amount is about 0.3 wt % of the unmodified block copolymer.

Specifically speaking, the modified block copolymers are prepared by contacting the base polymer, such as KRATON® G, with the Tone M100 monomer and the free radical initiator in a melt of the base polymer. The contacting of the base polymer with the initiator and the M100 monomer should be performed in an apparatus capable of imparting a high level of mixing so as to rapidly contact the reactants. Devices such as an extruder, a Banbury mixer, a sigma blade mixer, and the like are examples of devices capable of imparting high levels of mixing. Extruders are most preferred to ensure rapid mixing; a twin screw extruder or a single screw extruder may be utilized. The contacting of the base polymer with the Tone M100 monomer and the initiator should be performed at sufficiently high temperature for sufficient time to allow reaction of the initiator and grafting of the monomer. In carrying out the modification process, temperatures above about 200° C. and reaction time above about one minute are preferred.

The modified block copolymer can be extruded, pelletized, and then further mixed with at least one suitable aromatic polycarbonate to form the inventive blend. The amount of modified block copolymer used is generally in the range of about not less than 5 wt % to about 15 wt %, with about 10 wt % being preferred. The amount of aromatic polycarbonate present in the inventive blend is from about 85-95 wt %, with about 90 wt % being preferred.

The inventive blend may incorporate other useful components or additives. These other components include, for example, fillers, pigments, antioxidants, stabilizers, processing oils, extenders, mold release agents and the like.

The inventive blend has improved mechanical properties, particularly low Temperature Notched Izod Impact Strength and improved stiffness (flexural modulus) than similar blends utilizing unmodified block copolymer as shown by the examples and table.

The following non-limiting examples and Table I further illustrates the invention.

EXAMPLES

Example 1

The base polymer for this example, was a selectively hydrogenated styrene-butadiene-styrene triblock copolymer having polystyrene end-blocks of about 7400 number average molecular weight and a polybutadiene midblock of about 35,000 number average molecular weight. A solution of 0.3 wt % Lupersol 101 diluted in acetone (1.5 wt % base polymer basis) was added to the base polymer followed by 5.0 wt % Tone M100 monomer. The mixture was extruded utilizing a corotating twin screw extruder achieving a melt temperature of about 240° C. and a residence time of about 1 minute. The proton NMR spectrum of the product, following precipitation of the polymer from tetrahydrofuran into isopropyl alcohol indicated an Tone M100 content of 1.7 wt %.

Example 2

Example 1 was repeated. An Tone M100 grafting level of 2.0 wt % was determined from proton NMR analysis of the product.

Example 3

Example 1 was repeated except that the Tone M100 monomer added was increased to 10 wt % on a base polymer basis. Proton NMR analysis of the product revealed a 3.8 wt % Tone M100 content in the grafted polymer.

Example 4

The base polymer for this example was a selectively hydrogenated styrene-isoprene diblock copolymer having a polystyrene block of about 35,500 number average molecular weight and a polyisoprene block of about 61,500 number average molecular weight. A solution of 0.2 wt % Lupersol 101 diluted in acetone (1.5 wt % base polymer basis) was added to the base polymer followed by 5.0 wt % Tone M100 monomer. The mixture was extruded utilizing a corotating twin screw extruder achieving a melt temperature of about 270° C. and a residence time of about 1 minute. The proton NMR spectrum of the product following precipitation of the polymer from tetrahydrofuran into isopropyl alcohol indicated an Tone M100 content of 2 0 wt %.

Example 5

Example 4 was repeated except the Tone M100 monomer added was increased to 10 wt % on a base polymer basis. Proton NMR analysis revealed a 3.9 wt % Tone M100 content in the grafted polymer.

Example 6

Blends of bisphenol A polycarbonate and the functionalized block copolymers were prepared. Polycarbonate utilized for blend preparation was LEXAN 141 obtained from G. E. Plastics. Polycarbonate and blends thereof were dried at 160° C. for at least 8 hours prior to all processing steps. Blends were prepared on a corotating twin screw extruder. Specimens were injection molded for Flexural Modulus and Notched Izod testing. Notched Izod testing (1/8 inch) was conducted at −40° C. according to ASTM D256. Flexural Modulus testing was conducted according to ASTM D790. Test results are shown in Table I. This data illustrates the improvements in Flexural Modulus and low temperature Notched Izod in blends of polycarbonate and the modified polymers.

TABLE 1

| | Blend Composition | | | Properties ⅛" | |
|---|---|---|---|---|---|
| Example | LEXAN 141 (wt %) | Block Copolymer (wt %) | M100 Content (wt %) | Notched Izod (ft. lb/in) | Flexural Modulus (kpsi) |
| LEXAN 141 | 100 | 0 | 0 | 2.4 | 341 |
| Control 1 | 95 | 5 | 0 | 3.9 | 333 |
| 6A | 95 | 5 | 1.7 | 4.5 | 329 |
| 6B | 95 | 5 | 2.0 | 5.4 | 330 |
| 6C | 95 | 5 | 3.8 | 4.8 | 326 |
| Control 2 | 90 | 10 | 0 | 6.9 | 287 |
| 6D | 90 | 10 | 1.7 | 9.9 | 297 |
| 6E | 90 | 10 | 2.0 | 10.3 | 304 |
| 6F | 90 | 10 | 3.8 | 6.0 | 306 |

Control Blends 1 and 2 were prepared with unmodified block copolymer.
Blends 6A and 6D were prepared with modified block copolymer from Example 1.
Blends 6B and 6E were prepared with modified block copolymer from Example 2.
Blends 6C and 6F were prepared with modified block copolymer from Example 3.
LEXAN 141 is bisphenol-A polycarbonate from G.E. Plastics.

The data of Table 1 demonstrates the improvements in low temperature impact strength and stiffness of the inventive blends relative to the non-inventive blends. The data also demonstrates that the inventive blends have and exhibit ductile failure, i.e. unlike the non-inventive blends.

While this invention has been described in detail for the purpose of illustration, it is not to be construed as limited thereby but is intended to cover all changes and modifications within the spirit and scope thereof.

What is claimed is:

1. A blend comprising at least one aromatic polycarbonate and a hydrogenated block copolymer modified with a hydroxyethyl acrylate terminated caprolactone oligomer to form a modified block copolymer.

2. A blend as in claim 14 wherein said hydrogenated block copolymer is present in an amount of from about 96-99 wt % based on the weight of the modified block copolymer.

3. A blend as in claim 14 wherein said hydroxyethyl acrylate terminated caprolactone oligomer is present in an amount of from about 1-4 wt % based on the weight of the modified block copolymer.

4. A blend as in claim 14 wherein hydroxyethyl acrylate terminated caprolactone oligomer is present in an amount of about 2 wt % based on the weight of the modified block copolymer.

5. A blend as in claim 14 comprising from about 85-95 wt % of at least one said aromatic polycarbonate, and from about 5-156 wt % of said modified block copolymer.

6. A blend as in claim 14 wherein the aromatic polycarbonate is a dihydric phenol derivative selected from the group consisting of bisphenol-A; bis(4-hydroxyphenyl)methane, 2,2-bis(4-hydroxy-3-methylphenyl)propane, 4,4-bis(4-hydroxy-phenyl)hetpane, 2,2-(3,5,3',5,-tetrachloro-4,4'-dihydroxy-phenyl)propane, 2,2-(3,5,3',5-tetrabromo-4,4'-dihydroxy-diphenyl)propane, and (3,3-dichloro-4,4'-dihydroxydi-phenyl)methane.

7. A blend as in claim 14 wherein said aromatic polycarbonate is present in an amount of from about 85-95 wt %.

8. A blend having and exhibiting improved mechanical properties comprising:
   about 90 wt % bisphenol-A polycarbonates; and
   about 10 wt % of a hydrogenated block coplymer, wherein said block copolymer is a polystyrene-hydrogenated polybutadiene-polystyrene copolymer comprising about 2 wt % of a hydroxyethyl acrylate terminated epsilon-caprolactone oligomer.

9. A blend as in claim 8 having and exhibiting improved Low Temperature Notched Izod Impact Strength and Flexural Modulus.

* * * * *